US010938824B2

(12) United States Patent
Estes et al.

(10) Patent No.: US 10,938,824 B2
(45) Date of Patent: Mar. 2, 2021

(54) METRIC-BASED CONTENT EDITING SYSTEM

(71) Applicant: Microsoft Technology Licensing, LLC, Redmond, WA (US)

(72) Inventors: Paul Fraedrich Estes, Bellevue, WA (US); Raymond R. Ringhiser, Maple Valley, WA (US); Keith Douglas Senzel, Seattle, WA (US); Jered D Aasheim, Eugene, OR (US); David B Appel, Seattle, WA (US); Peter E Loforte, Bellevue, WA (US); Pranish Atul Kumar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 16/013,554

(22) Filed: Jun. 20, 2018

(65) Prior Publication Data

US 2019/0394203 A1    Dec. 26, 2019

(51) Int. Cl.
*G06F 16/23* (2019.01)
*G06F 21/62* (2013.01)
(Continued)

(52) U.S. Cl.
CPC ........ *H04L 63/102* (2013.01); *G06F 16/2379* (2019.01); *G06F 16/93* (2019.01);
(Continued)

(58) Field of Classification Search
CPC . H04L 63/102; H04L 63/101; G06F 21/6245; G06F 21/626; G06F 16/93; G06F 16/2379; G06F 2221/2137
See application file for complete search history.

(56) References Cited

U.S. PATENT DOCUMENTS

| 5,774,118 A | 6/1998 | Hatakama |
| 6,606,613 B1 | 8/2003 | Altschuler et al. |

(Continued)

FOREIGN PATENT DOCUMENTS

| CN | 107464043 A | 12/2017 |
| WO | 01027847 A1 | 4/2001 |

(Continued)

OTHER PUBLICATIONS

"International Search Report and Written Opinion Issued in PCT Application No. PCT/US2019/036642", dated Aug. 21, 2019, 12 Pages.

(Continued)

*Primary Examiner* — Alexander Lagor
*Assistant Examiner* — Vu V Tran
(74) *Attorney, Agent, or Firm* — Schwegman Lundberg & Woessner, P.A.

(57) ABSTRACT

A method may include maintaining in a database, a plurality of documentation content items for an application; receive, from a user, a request to modify a content item of the plurality of documentation content items, the content item associated with a feature of the application; accessing a rating of the user with respect to the feature; and based on the rating meeting a threshold: authorizing the user to modify the content item; receiving modifications to the content item from the user; and updating the content item in the database based on the modifications.

17 Claims, 5 Drawing Sheets

(51) Int. Cl.
*H04L 29/06* (2006.01)
*G06F 16/93* (2019.01)

(52) U.S. Cl.
CPC ...... *G06F 21/6245* (2013.01); *G06F 21/6263* (2013.01); *G06F 2221/2137* (2013.01); *H04L 63/101* (2013.01)

(56) References Cited

U.S. PATENT DOCUMENTS

| | | | |
|---|---|---|---|
| 6,691,159 | B1 | 2/2004 | Grewal et al. |
| 7,177,316 | B1 | 2/2007 | Pilecek |
| 7,672,543 | B2 | 3/2010 | Hull et al. |
| 7,680,901 | B2 | 3/2010 | Rechterman et al. |
| 7,730,030 | B1 | 6/2010 | Xu |
| 7,865,457 | B2 | 1/2011 | Ravin et al. |
| 7,933,815 | B2 | 4/2011 | Hutty et al. |
| 8,151,192 | B2 | 4/2012 | Black et al. |
| 8,280,882 | B2 | 10/2012 | Troy et al. |
| 8,473,423 | B2 | 6/2013 | Krishnakumar et al. |
| 9,020,887 | B2 | 4/2015 | Ngo et al. |
| 9,077,804 | B2 | 7/2015 | Kannan et al. |
| 9,230,031 | B2 | 1/2016 | Ickman et al. |
| 9,430,299 | B2 | 8/2016 | Naveh et al. |
| 9,635,181 | B1 | 4/2017 | McGann et al. |
| 9,686,086 | B1 | 6/2017 | Nguyen et al. |
| 9,716,745 | B2 | 7/2017 | Santero et al. |
| 9,767,486 | B2 | 9/2017 | Mihalik et al. |
| 10,439,836 | B2 | 10/2019 | Rosenberg et al. |
| 2003/0182450 | A1 | 9/2003 | Ong et al. |
| 2005/0256695 | A1 | 11/2005 | Oh |
| 2005/0268234 | A1 | 12/2005 | Rossi et al. |
| 2006/0047615 | A1 | 3/2006 | Ravin et al. |
| 2007/0050360 | A1 | 3/2007 | Hull et al. |
| 2008/0320081 | A1 | 12/2008 | Shriver-blake et al. |
| 2009/0183072 | A1 | 7/2009 | Stephenson et al. |
| 2009/0199097 | A1 | 8/2009 | Black et al. |
| 2009/0287682 | A1 | 11/2009 | Fujioka et al. |
| 2010/0004944 | A1 | 1/2010 | Palaniappan |
| 2010/0146483 | A1 | 6/2010 | Komarov et al. |
| 2010/0174783 | A1* | 7/2010 | Zarom .................. H04L 65/403 709/205 |
| 2010/0250529 | A1 | 9/2010 | Surendran et al. |
| 2011/0053126 | A1 | 3/2011 | Bielenberg et al. |
| 2012/0076283 | A1 | 3/2012 | Ajmera et al. |
| 2012/0109883 | A1 | 5/2012 | Iordanov et al. |
| 2012/0117070 | A1 | 5/2012 | Hiltz-laforge et al. |
| 2013/0124649 | A1* | 5/2013 | Triantos ................ H04L 51/046 709/206 |
| 2013/0253969 | A1 | 9/2013 | Das et al. |
| 2014/0025441 | A1 | 1/2014 | Eberlein et al. |
| 2014/0074272 | A1 | 3/2014 | Cowden, Iv |
| 2014/0082072 | A1 | 3/2014 | Kass et al. |
| 2014/0108183 | A1 | 4/2014 | Davis |
| 2014/0270108 | A1 | 9/2014 | Riahi et al. |
| 2014/0289702 | A1 | 9/2014 | Mcmahon et al. |
| 2015/0200893 | A1* | 7/2015 | Harris .................. G06Q 10/101 709/206 |
| 2015/0206063 | A1 | 7/2015 | Santero et al. |
| 2015/0288748 | A1 | 10/2015 | Oh |
| 2015/0310446 | A1 | 10/2015 | Tuchman et al. |
| 2015/0363405 | A1 | 12/2015 | Biswas et al. |
| 2016/0117941 | A1 | 4/2016 | Mitchell et al. |
| 2016/0253426 | A1 | 9/2016 | Snapir et al. |
| 2016/0267188 | A1 | 9/2016 | Spaulding et al. |
| 2016/0380933 | A1 | 12/2016 | Topaltzas et al. |
| 2017/0011308 | A1 | 1/2017 | Sun et al. |
| 2017/0178078 | A1 | 6/2017 | Fernando |
| 2017/0185589 | A1 | 6/2017 | Neff et al. |
| 2017/0223190 | A1 | 8/2017 | Mandel et al. |
| 2017/0288879 | A1 | 10/2017 | Quinlan et al. |
| 2018/0067903 | A1 | 3/2018 | Maker et al. |
| 2018/0068274 | A1 | 3/2018 | Buffington |
| 2018/0089156 | A1 | 3/2018 | Kapoor et al. |
| 2018/0096437 | A1 | 4/2018 | Sun et al. |
| 2019/0121827 | A1 | 4/2019 | Boswell et al. |
| 2019/0129973 | A1* | 5/2019 | Truong .................. G06F 16/93 |
| 2019/0291010 | A1 | 9/2019 | Benedetto et al. |
| 2019/0392049 | A1 | 12/2019 | Estes et al. |
| 2019/0394257 | A1 | 12/2019 | Estes et al. |

FOREIGN PATENT DOCUMENTS

| | | |
|---|---|---|
| WO | 2009076555 A2 | 6/2009 |
| WO | 2014012138 A1 | 1/2014 |

OTHER PUBLICATIONS

"International Search Report and Written Opinion Issued in PCT Application No. PCT/US19/036205", dated Sep. 10, 2019, 12 Pages.

"Web 2.0—Wikipedia", Retrieved from https://en.wikipedia.org/wiki/Web_2.0, Retrieved on Jan. 25, 2018, 16 Pages.

Adler, et al., "A Content-Driven Reputation System for the Wikipedia", In Proceedings of the 16th International Conference on World Wide Web Conference, May 8, 2007, 10 Pages.

Coyle, James E., Jr., "Wikis in the College Classroom: A Comparative Study of Online and Face-to-Face Group Collaboration at a Private Liberal Arts University", In Thesis Submitted to the Education, Health, and Human Services in Partial Fulfillment of the Requirements for the Degree of Doctor of Philosophy, May 2007, 273 Pages.

Koch, Michael, "Community Support in Universities—The Drehscheibe Project", In Proceedings of 1st International Conference on Communities and Technologies, Jan. 2003, 19 Pages.

Zheng, et al., "A Deep Learning Approach for Expert Identification in Question Answering Communities", In Journal of Computing Research Repository, Nov. 14, 2017, 7 Pages.

"Non-Final Office Action Issued in U.S. Appl. No. 16/013,534", dated Oct. 21, 2019, 9 Pages.

"Notice of Allowance issued in U.S. Appl. No. 16/013,534", dated Apr. 16, 2020, 18 Pages.

"International Search Report and Written Opinion Issued in PCT Application No. PCT/US2019/036204", dated Sep. 30, 2019, 11 Pages.

"Non Final Office Action Issued in U.S. Appl. No. 16/013,530", dated Apr. 30, 2020, 10 Pages.

"Final Office Action Issued in U.S. Appl. No. 16/013,530", dated Nov. 9, 2020, 10 Pages.

"Final Office Action Issued in U.S. Appl. No. 16/009,970", dated Nov. 16, 2020, 20 Pages.

* cited by examiner

METRIC-BASED CONTENT EDITING SYSTEM

BACKGROUND

Most software includes content generated to help users understand and use features of the software. For example, a spreadsheet application may include help entries for built-in function calls for use in cells and help entries on chart creation. The help entries are stored within the application or stored in an online location, in various examples.

Managing the content for each feature of an application creates its own set of challenges. For example, once content is created it may never be edited again. If a user relies on the content, but the feature has changed, the user may not be able to use the feature or waste computing resources trying to get the feature to work.

Collaborative content editing systems that exist in a networked environment may be used to generate content; however, these systems are insufficient to ensure accurate content is created and maintained with respect to all features of an application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
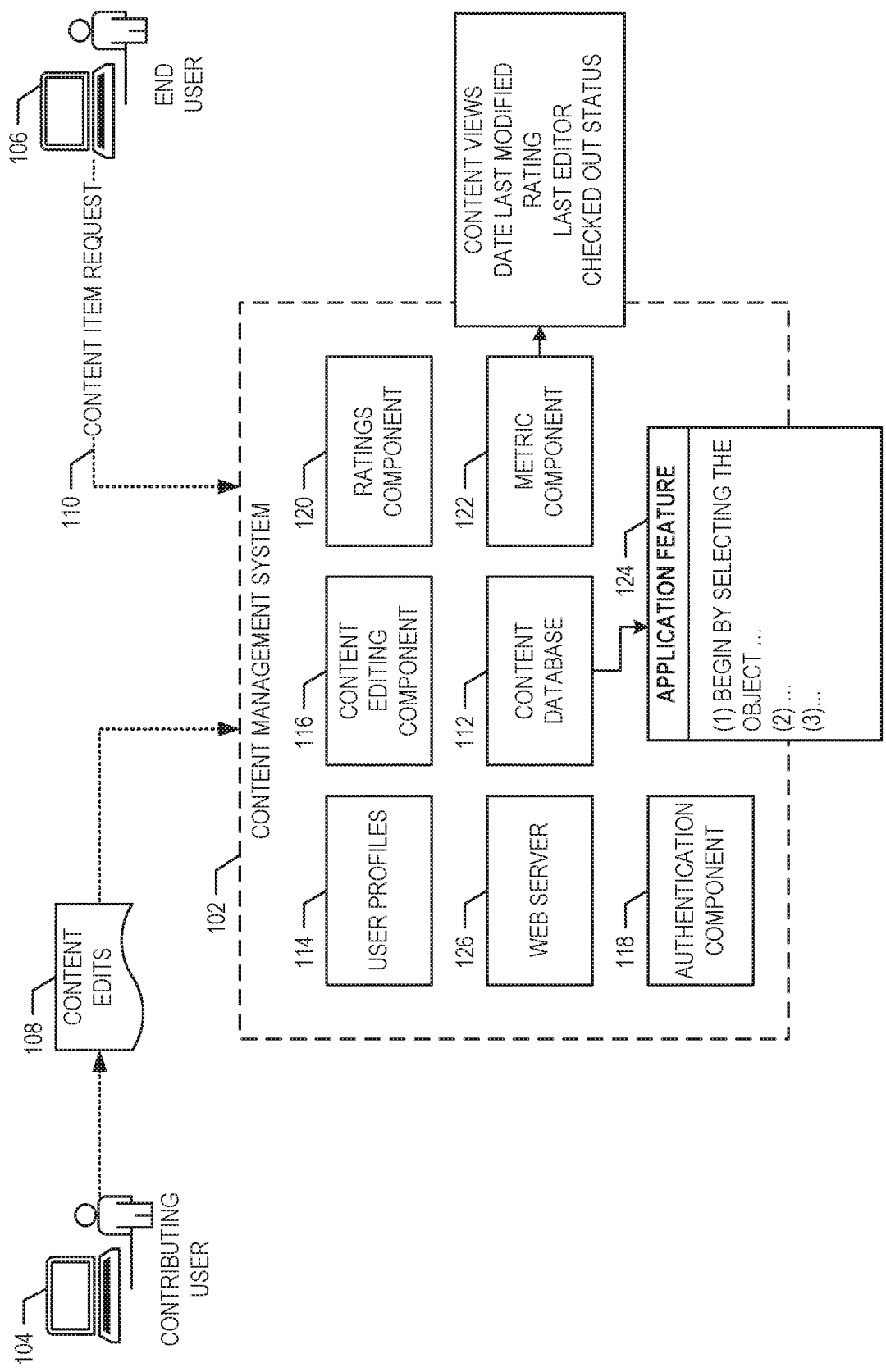
FIG. 1 is schematic diagram illustrating a collaborative editing session established by a user matching system, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. Described systems and methods may provide a user interface for an end-user or administrator to edit the variable values in some instances.

One of the problems in application development is providing electronically accessible documentation (also referred to as documentation content items or simply content) on all the available features of the application. Without this documentation, end users may not be able to leverage all features to help the end user accomplish the user's goal (e.g., creating a sales report or an investment pitch presentation deck).

For large-scale applications, the number of features may be so large as to overcome the amount of human resources available within a single development team. Additionally, any content generated for a feature may quickly become inaccurate should a feature be updated or removed from the application. Another problem is that not every editor of the content may be sufficiently knowledgeable to adequately document a feature. The lack of knowledge may not be readily apparent and may only manifest itself after complaints are received from end users. Accordingly, a technical solution is required to manage what even dedicated human resources of a company may not.

One solution is to allow anyone to edit the content (e.g., in a wiki). Although this may potentially lead to accurate content over a period of time, wikis have their own problems. For example, there may be two people that disagree over the content and they end up editing the document back and forth—leading to inconsistency that is often required to be useful to end users. Additionally, there is still no guarantee the content is accurate. This may be especially true for rarely used features of applications. Thus, wikis, like many content management systems, may not solve the problems described above.

Accordingly, to overcome these challenges, a network-based system may be used that objectively verifies that a user is an expert before allowing the user to edit or generate content. Additionally, the content may be monitored over a period of time to determine if the content is out-of-date, or if the content has dropped below a certain usefulness threshold. Depending on the recency of an edit to the content, the content may automatically revert back to a previous state.

FIG. 1 is schematic diagram illustrating an online documentation content management system, according to various examples. Although discussed in the context of documentation content to help users with features of application, the system may be used in other content management contexts (e.g., company reports, etc.). FIG. 1 includes content management system 102, contributing user 104, end user 106, content edits 108, and content item request 110. Content management system 102 is illustrated as including content database 112, user profiles 114, content editing component 116, authentication component 118, ratings component 120, metrics component 122, and content item representation 124.

For illustration purposes, content management system 102 is illustrated as set of separate components (e.g., content editing component 116, authentication component 118, etc.). However, the functionality of multiple, individual components may be performed by a single component. A component may represent computer program code that is executable by a processing unit (e.g., a core of a general-purpose computer processor, a graphical processing unit, an application specific integrated circuit, etc.) The program code may be stored on a computer-readable storage device and loaded into a memory of the processing unit for execution. Portions of the program code may be executed in parallel across multiple processing units. Execution of the code may be performed on a single device or distributed across multiple devices. In some example, the program code is executed on a cloud platform (e.g., MICROSOFT AZURE® or AMAZON EC2®) using shared computing infrastructure.

In various examples, the devices and system in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

A user (e.g., contributing user 104 and end user 106) may interact with a variety of systems/devices and a user have more than one role within each system. Throughout this disclosure, a user may be referred to with a modifier indicating the role the user is currently acting as. For example, a contributing user may generate, review, and edit content items stored within content database 112 that document policies, how to use a feature, etc. An end user may be a user that uses the application and accesses the content in content database 112. An administrator user may edit back-end scoring formulas, machine learning algorithms, alter thresholds for triggering content reviews, etc.

A user may be represented in user matching system 102 as a user profile data structure stored within user profiles 114. User profiles 114 may be part of another database or exist as a standalone database. The user profile data structure may include additional data structures. For example, the user profile data structure may include a one or more rating data structures that identifies ranking scores for the user's different roles, such as expertise ratings for features of an application. Ratings component 120 may be used to retrieve or calculate the score as described in further detail herein with respect to FIG. 3.

The user profile data structure may include a user identification for the user. Each user identification may be unique. The user identification may be comprised of alpha-numeric characters. The user identification is an e-mail address, in an example. The user identification may be shared across the roles of the user. Accordingly, a computer program may query user profiles 114 with a single user identification to retrieve data about the user for each role—as opposed to using a different user identification for each role. The user identification may be used across multiple applications in an application suite and may be the same identification used as an enterprise login.

The user profile data structure may store a hash of a password of a user. Authentication component 118 may authenticate a user based on the user identification and password. The user profile data structure may also identify what content—by type, language, section, taxonomy, or specific content entries—the user is authorized to edit.

The user profile data structure may be established through a combination of manual and automated entry. As indicated above, a user's identification may persist across multiple systems. Thus, multiple systems may access and alter data in the user profile data structure. For example, content management system 102 may provide a user interface (e.g., web, mobile, in-application, etc.) in which the user may view the data stored in their user profile data structure and edit the structure. In another example, an administrator user may access the user profile to add/edit details to a user's profile data structure.

Contributing user 104 and end user 106 may use client devices to communicate with content management system 102. The client devices may comprise, but are not limited to, a smartphone, tablet, laptop, multi-processor system, microprocessor-based or programmable consumer electronics, game console, set-top box, or any other device that a user utilizes to communicate over a network. In example embodiments, the client devices comprise a display module (not shown) to display information (e.g., in the form of specially configured user interfaces). In some embodiments, the client devices comprise one or more of a touch screen, camera, keyboard, microphone, and Global Positioning System (GPS) device.

Data used in content management system 102 may be organized and stored in a variety of manners such as in one or more database(s), such as content database 112. The specific storage layout and model used in the database(s) may take a number of forms—indeed, the database(s) may utilize multiple models. Database types may include, but are not limited to, a relational database (e.g., SQL), non-relational database (NoSQL), a flat file database, object model, document details model, graph database, shared ledger (e.g., blockchain), or a file system hierarchy. Database 128 may store data on one or more storage devices (e.g., a hard disk, random access memory (RAM), etc.), The storage devices may be in standalone arrays, part of one or more servers, and may be located in one or more geographic areas as part or shared computing infrastructure.

Content database 112 may store content items associated with features or other documentation related to applications (e.g., pivot tables, installation, updating, etc.). A content item may conform to standardized format (e.g., an XML schema). For example, a content item may include feature specific content such as a title and a body portion. Content item representation 124 is an example of what a content item may look like when rendered on a client device.

A content item may also include metadata that may or may not be visible or accessible to users. For example, the metadata may include a date that content was created, the date the content was last edited, if the content item is checked out for editing, etc. The metadata may also include a current rating of the content. Some of the metadata may be collected by metrics component 122. The rating may reflect how useful the content is with respect to a feature of an application.

Edits to a content item may be tracked in a log. For example, the log may indicate the date a content item was changed and an identifier of the user that changed it. The deletions and additions to the text of the content database may also be tracked in the log. Accordingly, the content item may quickly be able to revert back to an earlier state.

Content database 112 may store multiple descriptions of the feature. The descriptions may be stored according to domain, enterprise, access list, group, among others. For example, some features of applications may be disabled according to company policy. Accordingly, if a single description of the content item is maintained, an employee of the company may not understand why following the instructions does not yield the expected results. If a company specific description is used instead, however, the employee may be presented with an indication that the feature is disabled according to company policy. Similarly, if the company has specific instructions in which the feature is to be used, those specific instructions may be presented instead of a default description of the feature.

Web server 126 may be configured to serve data in the form of webpages or web applications from content management system 102 to contributing user 104 and end user 106. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of one or more pages served by web server 126. In response, web server 126 may transmit a web page that is rendered on a display device user matching system 102 or end user 104.

Content editing component 116 may be a web application provided via web server 126 to contributing user 104. Content editing component 116 include a login process implemented by authentication component 118. Content editing component 116 may be an application that executes on client device in other examples. Upon successful authentication, contributing user 104 may be presented with a user interface to submit new content, edit existing content, review edits by other contributing users, among other functions. In various examples, content editing component 116 is configured to permit multiple descriptions of the same content item.

In various examples, contributing user 104 may subscribe to be notified of changes to content items. Subscriptions may take a variety of forms, including, but not limited to subscription to applications, features of applications, contributing users, among others. The subscriptions may permit contributing user 104 to review edits by others before the edits publish to the general public. The subscriptions may be stored as part of the user's profile.

In various examples, metrics component tracks and stores data on the content items in content database 112, The data collected may be stored as metadata with the content item as described above, in a separate database, or both. The types of data stored by metrics component 122 may include the number of views of a content item, the length of time a contributing user has checked out a content item for editing, the rating of the content item, among others.

In some examples, metrics component 122 is used to trigger other functionality in content management system 102. For example, if a content item has not been edited for a threshold amount of time, a notification may be sent to a user to review the content to see if changes should be made. In another example, if the content item has not been viewed in a threshold amount of time, a notification may be sent to a user to determine if the content item should be deleted. In another example, if a content item has been checked out past a threshold amount of time, content management system 102 may transmit a notification to another to use to finish the content item or check the content item back in.

Metrics component 122 may also track company specific company policies that indicate a feature of an application is disabled but that have not had a description of the feature generated. For example, unless a company specific description of a content item has been created, an employee of the company may be unaware that the feature was disabled. Periodically, metrics component 122 may notify one or more users that the company specific description has not yet been generated.

Content management system 102 may use or define one or more application programming interfaces (API). An API provides a method for computing processes or systems to exchange data. A web-based API, such as may be defined by content management system 102 may permit users to retrieve and edit content items. The API may define a set of HTTP calls according to Representational State Transfer (RESTful) practices.

Because of the potential sensitive nature of data stored by and used by content management system 102, various security measures may be used to protect data at rest and in transmit. For example, APIs may use tokens or API keys to ensure only authorized parties may retrieve or use data stored by content management system 102. Additionally, data transmitted over the network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS as well as the separate data encryption.

As an additional privacy precaution, users may be provided an interface (e.g., via web server 126) to see data that has been collected by content management system 102. The user may have the option of deleting some or all of the data. Furthermore, the user may set a time for expiration of the data. In various examples, users may have to opt-in to data collection before data may be collected by content management system 102. Periodically, the user may be reminded that content management system 102 is collecting the data.

Figure 2:
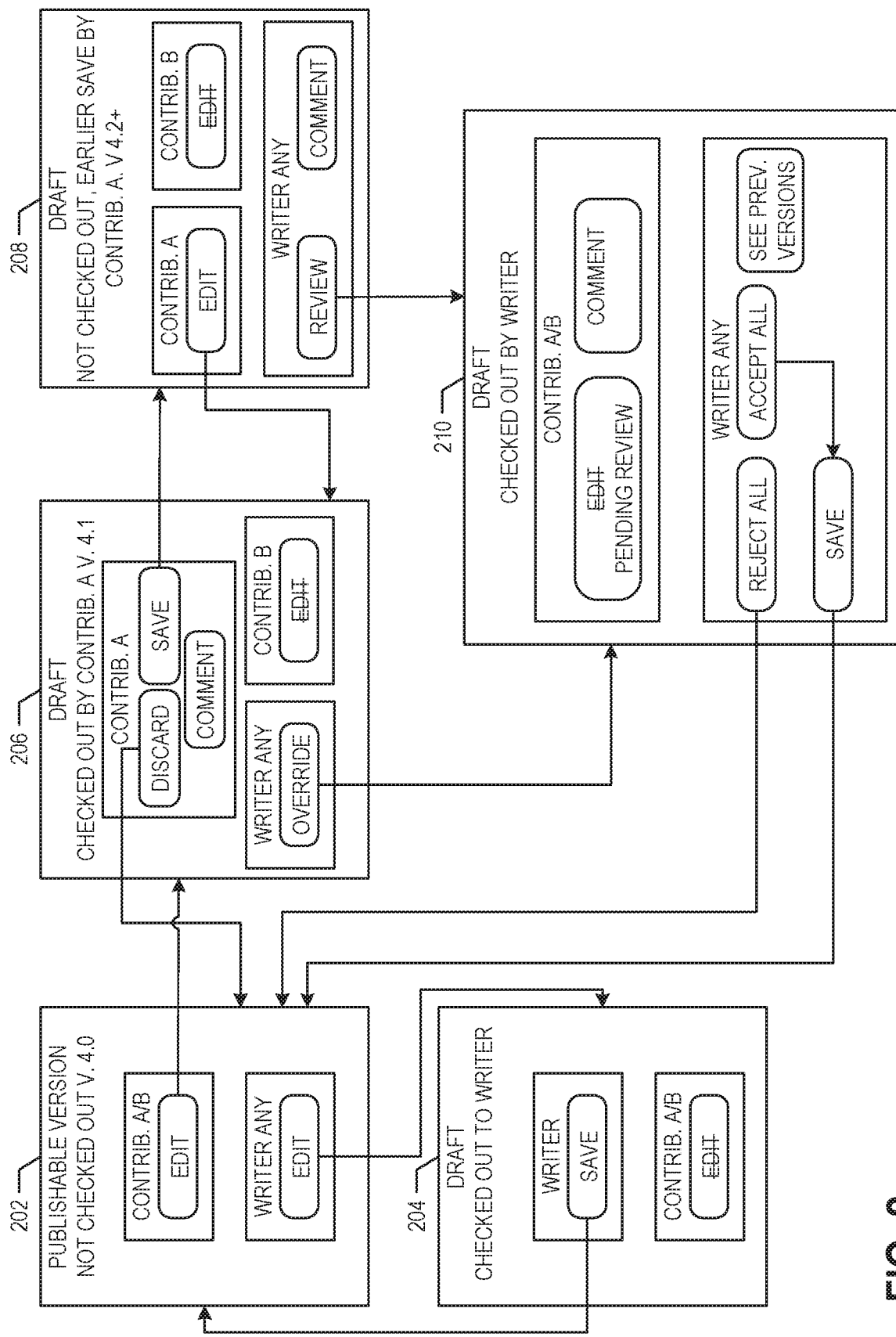
FIG. 2 is a state diagram illustrating editing of a content item, according to various examples.

FIG. 2 is a state diagram illustrating editing of a content item, according to various examples. FIG. 2, includes five states 202, 204, 206, 208, and 210. The states may represent available options users to edit a content item. The states include options for contributing user A, contributing user B. and a writer user. A writer user may be considered a contributor with additional oversight options. For example, a contributing user may need to have edits reviews by a writer user before the edits are published (e.g., made publicly available). In contrast, a writer may make changes and have the changed published without additional review. The states may correspond to options presented in a user interface by content editing component 116 for editing a content item that is currently at version 4.0.

State 202 may represent options available when the content item is not checked out for editing by any other users. State 202 includes an edit option for both contributing users and the writer user. If the writer user selects the edit function, the content item may be checked out and the state may move to state 204.

State 204 indicates that the content item has been checked out to the writer. In this state, the writer user has an option to save any edits made to the content item, but the contributor users do not have the ability to edit. If the writer chooses to save the edit, the state flows back to state 202.

If contributing user A chooses the edit option, state flows to state 206. At state 206, a draft of the content item may be edited by contributing user A. Contributing user A may have the ability to comment on the draft, discard any changes, or save changes made to the draft (e.g., creating version 4.1). Because the draft is checked out, contributing user B may not be able to edit at state 206. Writer users may have the option to override the checkout to contributing user A—moving to state 210.

Upon saving changes to the draft at state 206, state may flow to state 208. At state 208, the draft is no longer considered checked out by contributing user A. Contributing user A does have the option edit the draft again. State will go back to state 206 in such a scenario. At state 208, contributing user B is still prevented from editing. Writer users may have the option to review and comment on changes made by contributing user at state 210.

At state 210 the draft may be checked out by a writer. State 210 may be arrived at from either state 206 or state 208. For example, contributing user A forgets to save or is taking too long to save changed made at 206, a writer user may take control and check out the draft. In such a scenario, content editing component 116 may retrieve the last auto-saved version of the draft and present it to the checked out writer. The writer may also check out the draft from state 208. In various examples, a diff is performed by content editing component 116 to show the writer the changes (either saved or auto-saved) made by contributing user at state 206 from the original version (e.g., version 4 at state 202). Contributing users may not make edits at state 210 but still may leave comments on the draft.

At state 210, writer options may include rejecting all changes, accepting all the changes by saving the changes, and seeing previous versions of the content item. If the writer rejects all changes, the version of the content item may still increase, but a comment made left indicating the Changes were Rejected. If the changes are accepted, the content item may be updated with the changes the version may be incremented.

Figure 3:
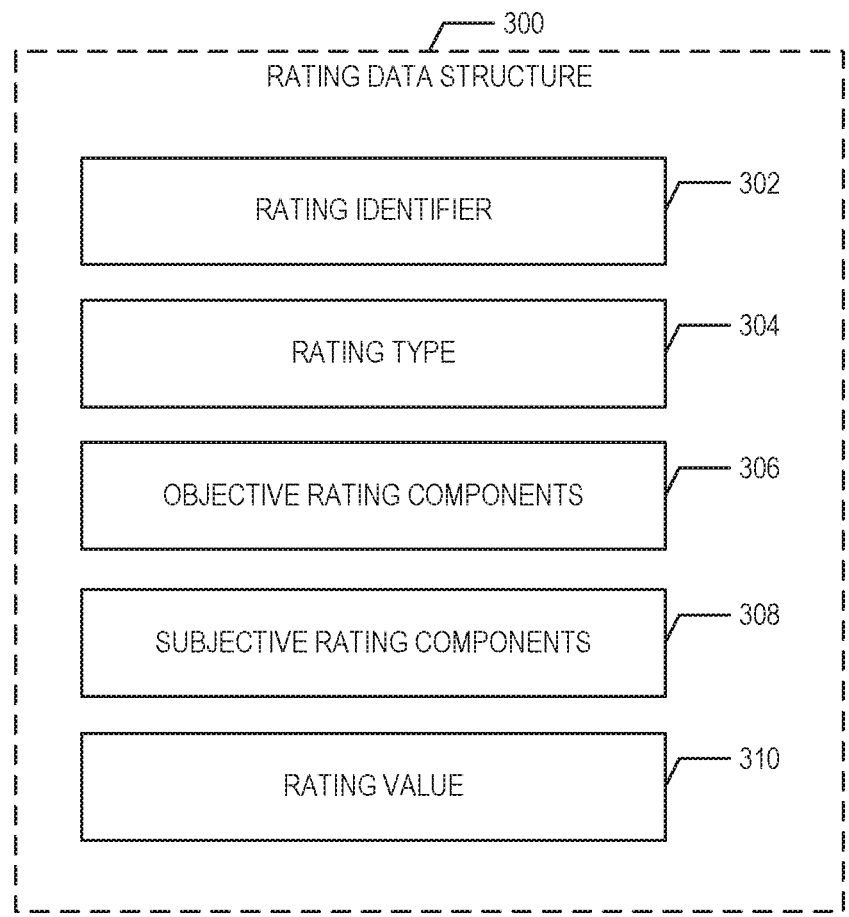
FIG. 3 is a schematic representation of a rating data structure 300, according to various examples.

FIG. 3 is a schematic representation of a rating data structure 300, according to various examples. FIG. 3 includes rating identifier 302, rating type 304, objecting rating components 306, subjective rating components 308, and rating value 310. Rating data structures may be maintained by ratings component 120 and stored within, or as associated with, a user profile.

The underlying structure of rating data structure 300 may conform to a standardized format. For example, an XML Schema Definition (XSD) file may be used to indicate the various illustrated portions of rating data structure 300 as described above. When a new rating data structure is created, the rating data structure may be stored as an XML document conforming to the XSD file. Other file formats may be used without departing from the scope of this disclosure.

Rating data structure 300 is illustrated as a generic rating data structure that may be used for multiple types of ratings. More specific rating data structures may also be used. For example, there be separate application proficiency and content editor rating data structures. In such cases, rating type 304 may not be needed.

Rating data structures may be managed—created, deleted, updated, etc.—using a rating management UI. The rating management UI may be served as a web interface or standalone application, in various examples. The rating management UI may be hosted within or be communicatively coupled to content management system 102. Access to the rating management UI may be managed according to authorized personnel. The rating management UI may present a set of input UI elements to define a rating data structure. In some examples, the UI inputs correspond to fields in rating data structure 300.

Rating identifier 302 may indicate the name of the rating. The name be a function of rating type 304. For example, rating types may be for application feature proficiencies, overall application proficiency, ratings from other users, time to complete a task using an application features, among others. Accordingly, rating identifier 302 may be "pivot tables" and rating type 304 may be "feature proficiency."

Ratings may be objective in that the measurement originates from a trusted third-party or is quantitative in nature. In contrast, subjective rating components 308 may originate from other users and be qualitative in nature. If the rating originates from a user—even if the rating is a number—as opposed to measured application data, etc., the rating may be considered subjective.

Objective rating components 306 may include measurements of data related to the type of rating. For example, if rating type 304 is for application feature proficiencies, objective rating components 306 may include the number of times a feature has been used, the frequency the feature has been used, certification from third parties related to the feature, job history, education level, obtained degrees, closeness to meeting an estimated budget, among other metrics.

Subjective rating components 308 may include ratings given by human users related to the type of rating. For example, there may be a quality rating of an application support page (e.g., a content item) attributable to a user. In such an instance, rating identifier 302 may include the name of the support page or a name of feature of an application that the support page is for. Another subjective rating may be an overall rating for a user with respect to how helpful the user was in assisting an end user using the features. For example, after completing a document, the end user may be given the opportunity to rate how helpful the user was (e.g., a 1-5 rating).

Rating value 310 may include a value representing rating identifier 302 for rating type 304. The value may be quantitative or qualitative in nature. Rating 310 may be calculated based on the values included in objecting rating components 306 and subjective rating components 308 for a particular rating. For example, a weighting formula may be used for the various components such as (0.2)(objective rating 1)+(0.3)(objective rating 2)+(0.5)(subjective rating 1). The formula and weights may be stored with within rating data structure 300 and may editable by an administrator user.

Signal collection may be used to obtain data for objecting rating components 306 and subjective rating components 308. The signals may come from within content management system 102, applications associated with content management system 102, as well as external sources. External sources may include, but are not limited to, personal or professional social networks, accreditation services, third party data aggregators, etc.

An external source may be accessed using a variety of means. For example, an external source may provide an API that enables content management system 102 to specify a user identification. In response to the API call, the external source may format a response data package with data associated with the user identification. The information may include proficiency ratings for applications, application features, profession data such as current job title, and the like. The information may be stored as user characteristics or ratings within a user profile.

In another example, content management system 102 may access the external source using user provided credentials (e.g., as stored in a user profile data structure) to act as the user. Then, content management system 102 may use screen scraping techniques, as are known in the art, to retrieve information such as technical proficiency ratings, from the external source.

Data retrieved from an external source may be transformed to a format consistent with an ontology used by content management system 102. For example, a professional social network may have skills a user can enter into the user's profile. A data map—as stored in content management system 102—may identify a mapping between the skills of the social network and user characteristics of a user profile data structure. Accordingly, when retrieving data from the social network, the map be queried to obtain the ontology terminology (e.g., a feature rating or application proficiency) for the skill. The mapping may also identify a scale to use (e.g., 50% to a 2 rating).

Figure 4:
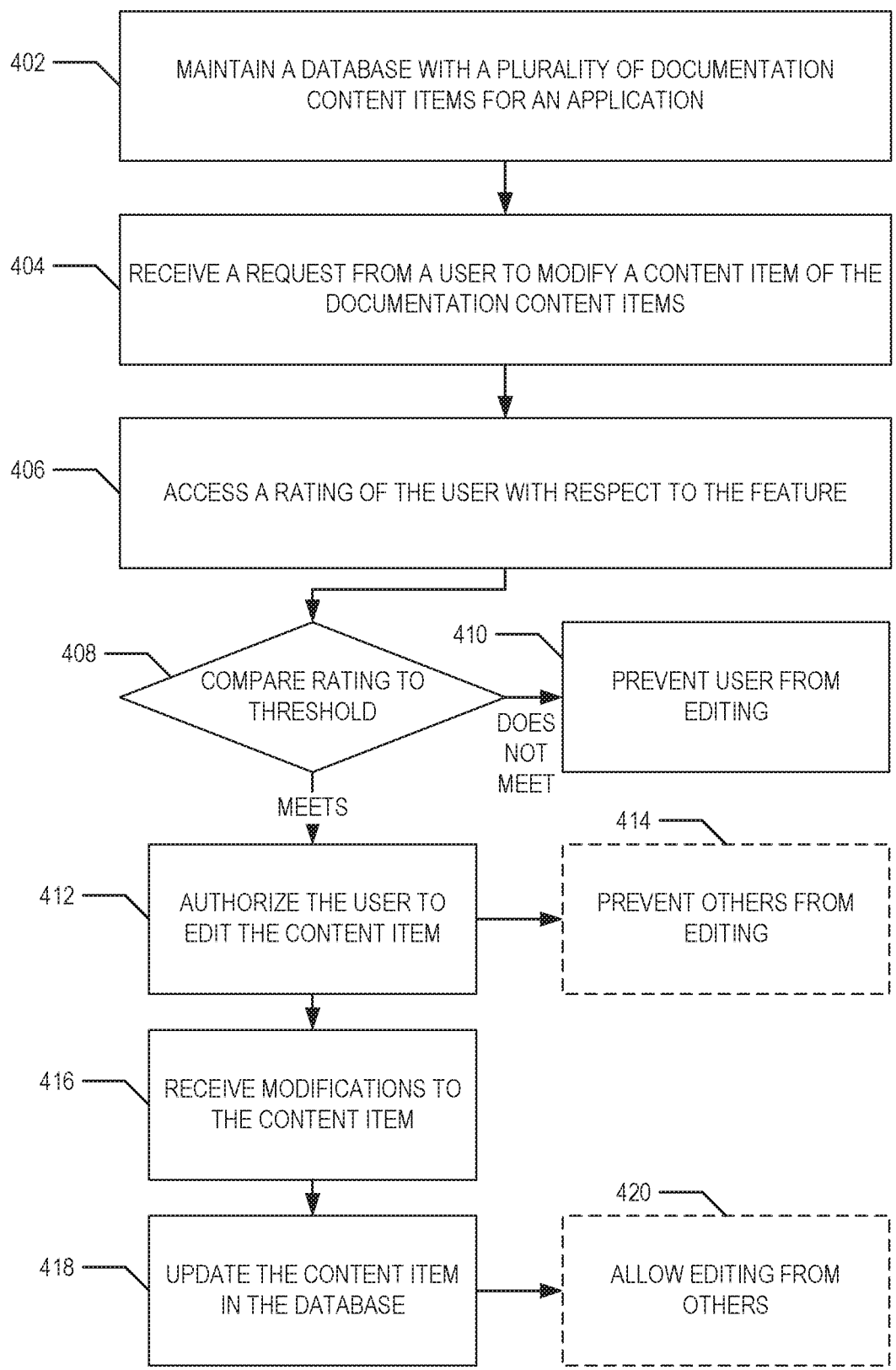
FIG. 4 is a flowchart representation of a method to update a documentation content item, according to various examples.

FIG. 4 is a flowchart representation of a method to update a feature rating, according to various examples. The method may be embodied in a set of instructions stored in at least one computer-readable storage device of a computing device (s). A computer-readable storage device excludes transitory signals. In contrast, a signal-bearing medium may include such transitory signals. The computing device(s) may have one or more processors that execute the set of instructions to configure the one or more processors to perform the operations illustrated in FIG. 4. To this end, the one or more processors may instruct other parts of the computing device to cam/out the set of instructions. For example, the computing device may instruct a network device to transmit data to another computing device or the computing device may provide data over a display interface to present a user interface. In some examples, performance of the method may be split across multiple computing devices.

At operation 402, in various examples, a database is maintained with a plurality of documentation content items for an application. A documentation content item may be a content item that adheres to a structured format (e.g., a title and a body) for explaining a feature of an application (e.g., pivot tables or chart generation). Multiple descriptions may be maintained for the feature of the application. The description may refer to the body of the documentation content item. The descriptions may be associated with a set of users (e.g., a company) according to a domain (e.g., company-.com). The descriptions may also be associated with a subset of users of a company (e.g., by department or distribution list).

A request to view the content item may be receive from another user. The request may include an identifier of the another user such as an e-mail address. A first description of a plurality of descriptions of the feature of the application may be transmitted to the another user based on the identifier of the another user. For example, the domain of the identifier may be used to retrieve the domain specific description of the feature of the application.

At operation 404, in various examples, a request is received from a user to modify a content item of the documentation content items. For example, the user may log in to content management system 102 and be presented with an interface provide by content editing component 116. The user may then select a content item (e.g., from a drop-down menu, a list, or via a search query) for modification. The content item may be associated with a feature of an application.

At operation 406, in various examples, a rating of the user with respect to the feature may be accessed. For example, a user profile of the user may be retrieved to obtain a rating value (e.g., rating value 310) with respect to the feature of the application. The rating value may be compared to a threshold at operation 408. The threshold may be the level (e.g., a 7 out of 10) at which a user may considered competent enough to describe how to use the application feature. The threshold may be set by an administrator user. The threshold may be set to an expert level (e.g., a 9 out of 10) in various examples.

At operation 410, the user has not met the threshold and prevented from editing the content. In various examples, an indication may be presented to a user before the request to modify is made that indicates whether or not the user is permitted to edit the content. For example, content items that the user is not permitted to edit because of a rating or other access control reasons may be greyed out when presented. The user may filter the content items according to what items the user is permitted to edit in various examples.

In various examples, additional requirements may be made beyond the threshold rating. When there are multiple descriptions of the content item for the application feature, a user may be required to belong to a certain domain. For example, if there is a company.com specific description, the user's identifier may be required to end with company.com. In various examples, a whitelist of personnel authorized to edit contain may be queried before the user is authorized. These additional requirements may supersede the threshold rating. For example, an administrator might have rights to company documentation, but not the public topic regardless of rating.

At operation 412, when the user has met the rating threshold and/or the other requirements, the user is authorized to edit the content item. In various examples, at operation 414 other users are prevented from editing the content item—e.g., the content item has been checked out. Some users may be able to override the user checking out the item such as administrator users. Preventing other users from editing may include flagging the content item as not editable by at least one other user in response to the authorizing. After the user has made and saved edits (e.g., updating operation 418), the content item may be flagged as editable by the at least one other user (operation 420). Flagging may include updated an entry in a database of content items.

In various examples, at operation 416, modifications to the content item are received from the user. The modifications may originate from edits made within content editing component 116 as presented as a user interface to the user. The differences between the content item before and after the modifications may be logged (e.g., a diff may be stored in a database).

In various examples, a notification may be transmitted to the at least one other user based on receiving the modifications, the at least one other user subscribing to changes made to the content item. Subscriptions may be stored as metadata associated with the content item. In various examples, the at least one other user may reject or accept the modifications before the content item is updated (operation 418). The notification may be transmitted as a push notification to a computing device or as an electronic message within a user interface of content editing component 116.

In various examples, at operation 418, the content item may be updated in the database based on the modifications. For example, a body portion of an entry in the database may include text/images by the user for the content item. A version number of the content item may be incremented in some examples in response to the updating. After the updates have been made in the database, other users may be allowed to edit the content item again at operation 420.

A timer may be started (by content management system 102, for example) once a user checks out a content item for editing. If a threshold amount of time passes and the user has not committed the changes (e.g., saved) for updating a notification may be sent to another user such as administrator users. The administrator user may then accept or reject auto-saved versions of any edits the user made.

After an update has been made, ratings of the content item may be tracked. For example, content management system 102 may present user interface elements to rate (e.g., helpful/not helpful, rating 1-5, etc.) the content item when presenting the content item. The rating may be associated with versions of the content item. Accordingly, after a period of time (e.g., a week) a rating of the content item before the updating may be compared to a rating of the content item after the updating to generate a difference rating. The difference rating may be positive or negative. When the difference rating indicates a drop in rating above a threshold amount, the changes to the content item may be reversed. For example, if a 1-5 scale is used, the threshold amount may be a difference rating indicating a of drop 0.5 points. The changes may be reversed by retrieving the diff between the content item before and after the update. The contributing user who made the change that has been reversed may be sent a notification of the reversal.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
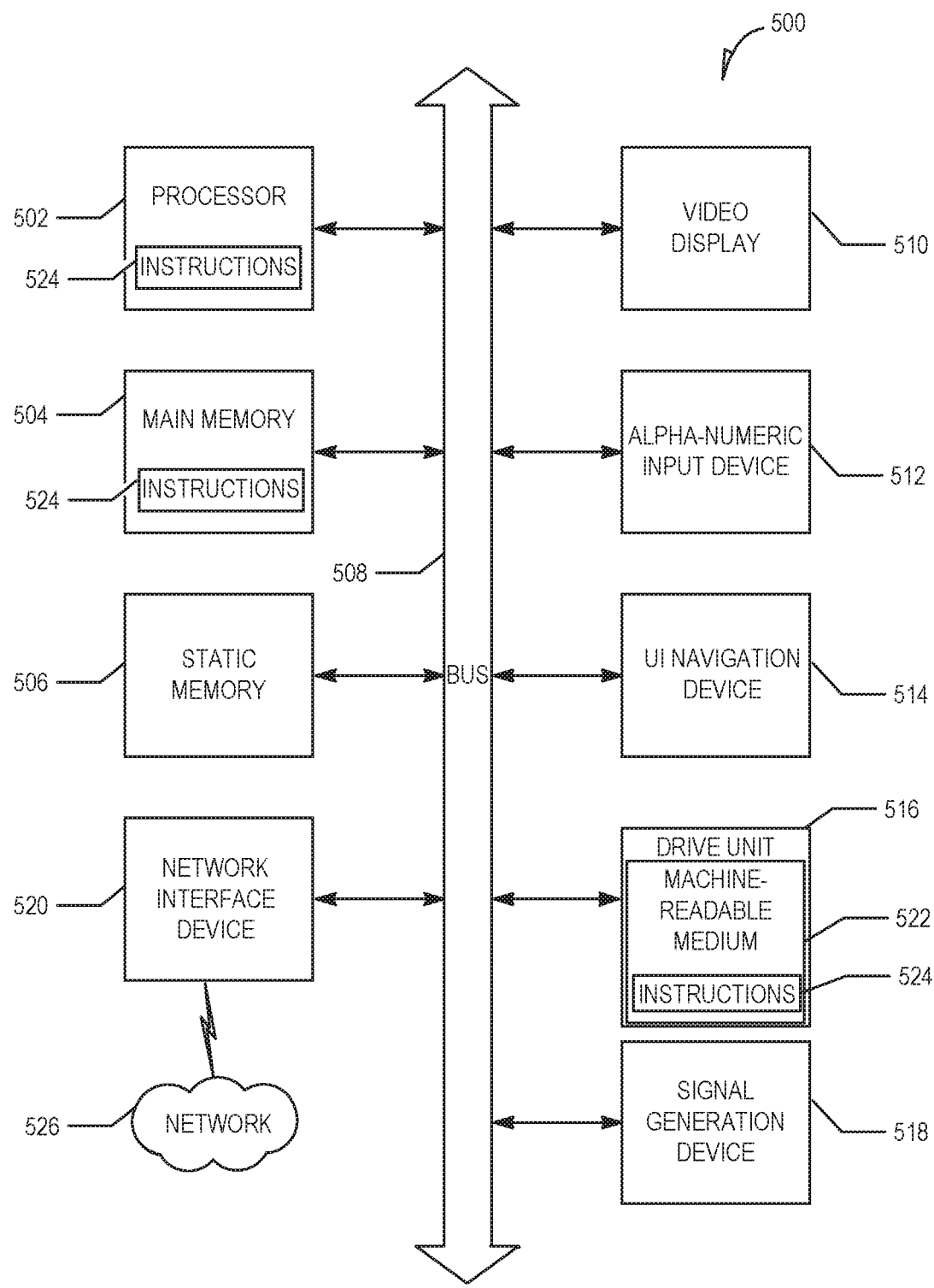
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus), The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or another sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
    maintaining in a database, a plurality of documentation content items for an application;
        receive, from a user, a request to modify a content item of the plurality of documentation content items, the content item associated with a feature of the application;
        accessing a rating of the user with respect to the feature; and based on the rating meeting a first threshold:
        authorizing the user to modify the content item;
        receiving modifications to the content item from the user; and
        updating the content item in the database based on the modifications;
    comparing a rating of the content item before the updating to the rating of the content item after the updating to generate a difference rating; and
    based on the difference rating indicating a drop in the rating of the content item that is greater than a second threshold amount, reversing the modifications to the content item.

2. The method of claim 1, further comprising:
    flagging the content item as not editable by at least one other user in response to the authorizing; and
    flagging the content item as editable the at least one other user after the updating.

3. The method of claim 1, further comprising:
    transmitting a notification to at least one other user based on receiving the modifications, the at least one other user subscribing to changes made to the content item.

4. The method of claim 1, further comprising:
    transmitting a notification to another user to review the content item after a threshold amount of time has passed since the updating.

5. The method of claim 1, further comprising maintaining a plurality of descriptions of the feature of the application for the content item, each description associated with a domain.

6. The method of claim 5, further comprising:
    receiving a request to view the content item from another user; and
    transmitting a first description of the plurality of descriptions of the feature of the application based on an identifier of the another user.

7. A computer-readable storage device comprising instructions, which when executed by at least one processor, configure the at least one processor to perform operations comprising:
    maintaining in a database, a plurality of documentation content items for an application;
    receive, from a user, a request to modify a content item of the plurality of documentation content items, the content item associated with a feature of the application;
    accessing a rating of the user with respect to the feature; and based on the rating meeting a first threshold:
    authorizing the user to modify the content item;
    receiving modifications to the content item from the user; and
    updating the content item in the database based on the modifications;
    comparing a rating of the content item before the updating to the rating of the content item after the updating to generate a difference rating; and
    based on the difference rating indicating a drop in the rating of the content item that is greater than a second threshold amount, reversing the modifications to the content item.

8. The storage device of claim 7, further comprising instructions, which when executed by the least one processor, configure the at least one processor to perform operations comprising:
    flagging the content item as not editable by at least one other user in response to the authorizing; and
    flagging the content item as editable by the at least one other user after the updating.

9. The storage device of claim 7, further comprising instructions, which when executed by the least one processor, configure the at least one processor to perform operations comprising:
    transmitting a notification to at least one other user based on receiving the modifications; the at least one other user subscribing to changes made to the content item.

10. The storage device of claim 7, further comprising instructions, which when executed by the least one processor, configure the at least one processor to perform operations comprising:
    transmitting a notification to another user to review the content item after a threshold amount of time has passed since the updating.

11. The storage device of claim 7, further comprising instructions, which when executed by the least one processor, configure the at least one processor to perform operations comprising:
    maintaining a plurality of descriptions of the feature of the application for the content item, each description associated with a domain.

12. The storage device of claim 11, further comprising instructions, which when executed by the least one processor, configure the at least one processor to perform operations comprising:
  receiving a request to view the content item from another user; and
  transmitting a first description of the plurality of descriptions of the feature of the application based on an identifier of the another user.

13. A system comprising:
  at least one processor;
  a storage device comprising instructions, which when executed by the at least one processor, configure the at least one processor to perform operations comprising:
  maintaining in a database, a plurality of documentation content items for an application;
  receive, from a user, a request to modify a content item of the plurality of documentation content items, the content item associated with a feature of the application;
  accessing a rating of the user with respect to the feature; and based on the rating meeting a first threshold:
    authorizing the user to modify the content item;
    receiving modifications to the content item from the user; and
    updating the content item in the database based on the modifications;
  comparing a rating of the content item before the updating to the rating of the content item after the updating to generate a difference rating; and
    based on the difference rating indicating a drop in the rating of the content item that is greater than a second threshold amount, reversing the modifications to the content item.

14. The system of claim 13, wherein the storage device further comprises instructions, which when executed by the least one processor, configure the at least one processor to perform operations comprising:
  flagging the content item as not editable by at least one other user in response to the authorizing; and
  flagging the content item as editable the at least one other user after the updating.

15. The system of claim 13, wherein the storage device further comprises instructions, which when executed by the least one processor, configure the at least one processor to perform operations comprising:
  transmitting a notification to at least one other user based on receiving the modifications, the at least one other user subscribing to changes made to the content item.

16. The system of claim 13, wherein the storage device further comprises instructions, which when executed by the at least one processor, configure the at least one processor to perform operations comprising:
  transmitting a notification to another user to review the content item after a threshold amount of time has passed since the updating.

17. The system of claim 13, wherein the storage device further comprises instructions, which when executed by the least one processor, configure the at least one processor to perform operations comprising:
  maintaining multiple descriptions of the feature of the application for the content item, each description associated with a domain.

* * * * *